United States Patent [19]
Pederson

[11] Patent Number: 6,131,637
[45] Date of Patent: Oct. 17, 2000

[54] TIRE DERIMMER

[76] Inventor: Les Pederson, 4444 S. York St., Sioux City, Iowa 51106

[21] Appl. No.: 08/876,164

[22] Filed: Jun. 13, 1997

[51] Int. Cl.[7] .................................................. B60C 25/132

[52] U.S. Cl. .......................................... 157/1.17; 157/1.2

[58] Field of Search ..................... 157/1.1, 1.17, 157/1.2

[56] References Cited

U.S. PATENT DOCUMENTS

| | | | |
|---|---|---|---|
| 4,059,140 | 11/1977 | Sedgwick | 157/1.2 |
| 4,355,674 | 10/1982 | Grasso | 157/1.2 |
| 4,945,968 | 8/1990 | Bradburn | 157/1.17 |
| 5,415,218 | 5/1995 | Shibazaki | 157/1.17 X |

*Primary Examiner*—James G. Smith

[57] ABSTRACT

A power tool for removing a tire from a rim for purposes of disposition of the tire. Because preservation of the wheel is not an object, the tool uses the force of rams first to grasp the tire then to force the wheel out of the tire.

5 Claims, 2 Drawing Sheets

TIRE DERIMMER

BACKGROUND AND SUMMARY OF THE INVENTION

This invention pertains to powered devices to remove the wheel and rims from tires which are mounted on those wheels or rims. It is particularly useful when the wheel is to be wasted or used as scrap metal and the tire is to be salvaged as used rubber.

In every salvage yard, particularly the larger yards, tires mounted on wheels are presented for salvage. Often times those wheels are not identified as usable on any particular make or model of automobile or other vehicle on which the wheel might be used. Also, the wheel may be already damaged so as to be unusable. In either case, it is obvious that the wheel is best salvaged by use as scrap metal, and the tire, individually is so badly used as to be simply scrap rubber. In such cases the separation of wheel and tire becomes a problem only of the speed at which they can be separated without regard for further usefulness.

Present methods of separating the two either are largely confined to crushing the wheel on a platform to which the wheel is lifted and laid flat. The method is effective although slow and labor intensive.

By the present invention, applicant provides a much less laborious device which operates considerably faster and accomplishes fully the removal of the rim from the tire so that the material in each is available for re-use.

DESCRIPTION

Figure 1:
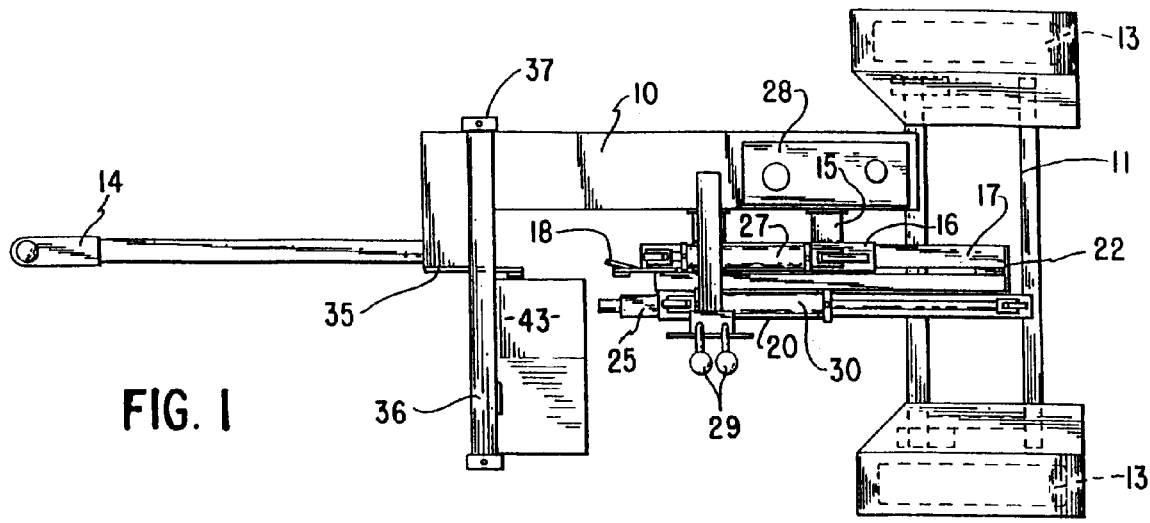
FIG. 1 is a top plan view of a mobile embodiment of the tool.
Figure 2:
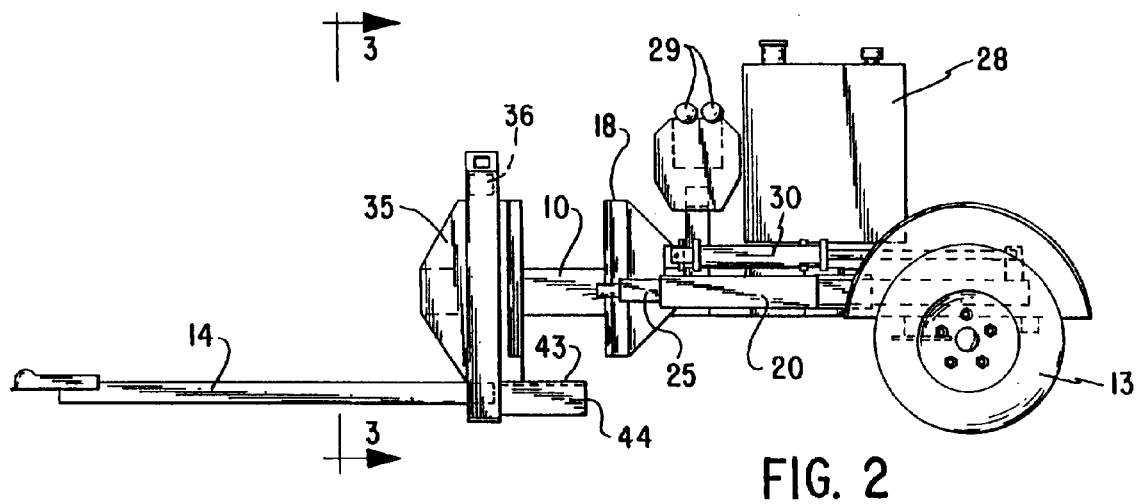
FIG. 2 is a side elevational view of the tool of FIG. 1

Briefly the invention comprises a self contained power tool for removing the rims from a mounted tire casing. The tool is preferably portable and easily moved. It is powered by any of several power sources and operates by use of powered (preferably hydraulic) rams adapted to press the wheel out of the casing of the tire.

More specifically and referring to the drawings, the tool is generally mounted on a base or frame composed principally of a beam 10 having cross members 11. Preferably for use of transport, this base is supported by axles 12 on which wheels 13 are journaled. A tongue 14 may also be provided by which the tool may be transported from one location to another. It will be apparent that the frame may also be permanently anchored to the ground. However, at present there are few salvage places that have a sufficient continuing supply of mounted tires for salvage to warrant a stationary unit so the applicant prefers the mobility of a wheel-mounted device.

As part of the frame, lateral supports 15 are fixed to the beam 10 and carry a slide tube 16. The latter tube forms an outer frame in which a slide 17 is disposed to slide longitudinally. Preferably the tube 16 and slide 17 are square or rectangular to provide a resistance to any circumferential movement of one relative to the other. At its forward end (the end toward the tongue 14 in the figures), the slide carries a forked end having two tines 18 usable to hold the tire as will be described later. The slide 17 also carries a ram carrying holder 20 joined to the slide by a connecter rib 21 attached to the slide by a plate 22 and at the other end of the support 23 of the forked end with its tines 18. This holder 20 provides a housing for a ram assembly including a ram member 25.

Longitudinal movement of the slide 17 and its associated part, the holder 20, is both provided and controlled by a double acting hydraulic piston and cylinder device 27. This device is operated from a pump (not shown) driven by a motive device enclosed in the housing 28. In the portable units this device will probably be a small internal combustion engine. However, for a permanently placed device an electric motor will also be effective. Controls for the flow of fluid to the cylinder may be provided as indicated at 29.

Independent movement of the ram member 25 within the holder 20 is also controlled by a double-acting piston and cylinder assembly 30 This assembly, in its operation, causes the ram member 25 to be slid longitudinally of the holder 20 for a purpose to be explained.

Figure 3:
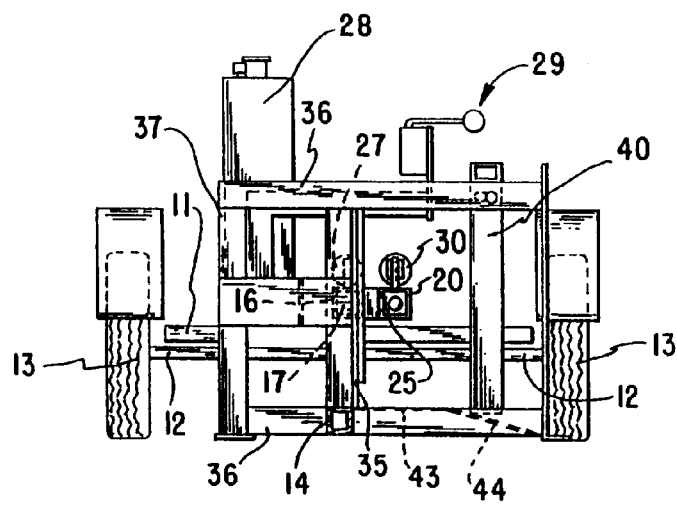
FIG. 3 is a view from line 3—3 of FIG. 2.

The wheel and tire assembly to be worked on are supported horizontally by a framework composed of a heavy vertical plate 35 (FIG. 3) securely fastened to the plate 10. A pair of horizontal members, one at the top and one at the bottom of the framework, together with an added vertical member 37 form a rectangular framework from which the horizontal members 36 extend. A vertical bar 40 is provided for added support of the tire 42. This bar 40 may be adjustable laterally by being slotted as at 41 to allow for some differences in the sizes of tires 42 being supported.

Vertical support and location of the tire and wheel assembly may be provided by a platform 43 and ramp 44 leading up to the platform.

To use the device, the tire 42 and the wheel 45 on which the tire is mounted are rolled onto the platform 43. One side of the tire 42 is placed against the plate 35, and the opposite side should rest against the bar 40. If necessary to accomplish that position, the bar 40 may be adjusted.

The piston-cylinder assembly 27 is then actuated to press the tines 18 of the forked end against the tire. This press must be very firm so as to hold the tire securely. Preferably the position of the tines 18 and the plate 35 are set so that the tines straddle the plate for more secure holding of the tire.

Figure 4:
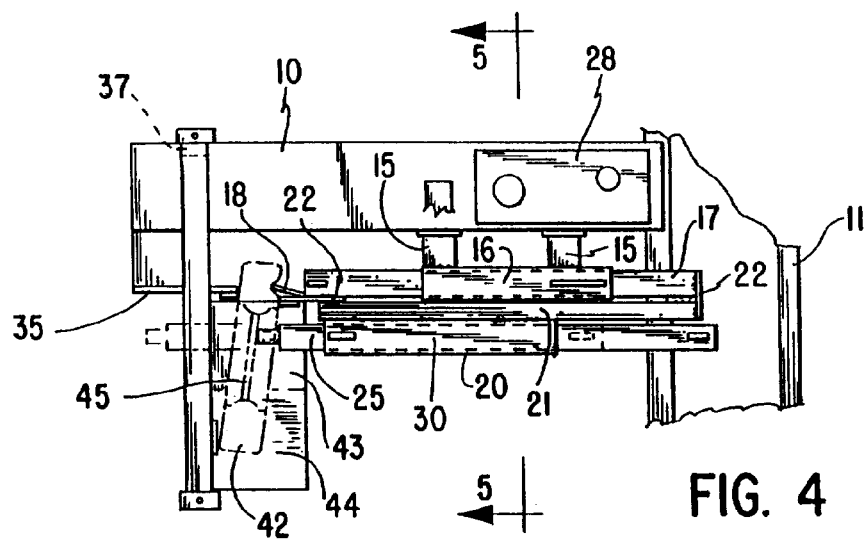
FIG. 4 is a detailed top plan view of the tool showing the rams holding the tire in place.
Figure 5:
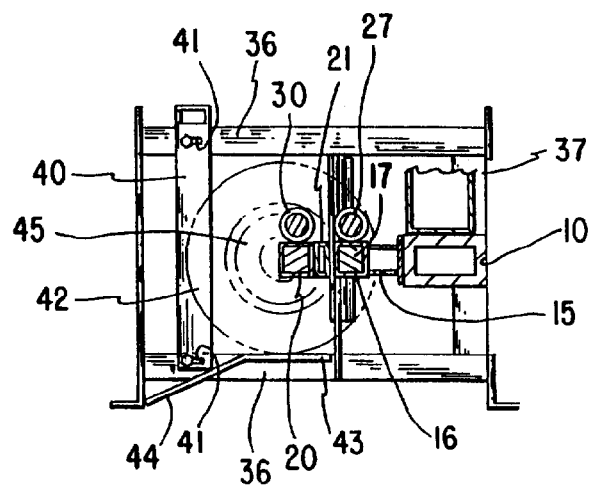
FIG. 5 is a view from line 5—5 of FIG. 4.

At this point, the ram member 25 has also been advanced close to or against the wheel (See FIG. 4) because the holder 20 is also advanced. Actuation of the second piston-cylinder assembly 30 causes the ram member 25 to advance further and press the wheel out of the tire. In this part of the operation, the wheel may often be deformed, but that deformation is inconsequential, since the wheel is to be salvaged only for scrap metal.

Thus, a quick and easy system for extracting the wheel from a mounted tire is provided. Particularly with nearly uniform sizes of tires, the wheel can be pressed out quickly with very little manual labor or skill be necessary.

I claim as my invention:

1. A press device for removing a wheel from a mounted wheel and tire assembly comprising a frame, means on said frame for supporting said wheel and tire assembly in a near vertical position including vertical bar supports spaced to engage opposite sides of said tire, said supports including a first fixed support and a second support which is laterally adjustable, press means mounted on said frame for holding said tire against said means for supporting said wheel and tire assembly and an independently operated ram device engageable with said wheel adapted to press said wheel out of said assembly.

2. The press device of claim 1 in which said fixed support is a plate disposed so that one edge is positioned to engage said tire.

3. The press device of claim 2 in which said forked end include tines to engage said tire opposite said plate so that said tines press said tire against said plate, said plate being positioned laterally between said tines.

4. The press device of claim 1 in which said press means for holding said tire includes a slide tube fixed to said frame and a slide slidably disposed for longitudinal movement within said tube, said slide including an end adapted to press against said tire, said slide also including a ram carrying holder, said ram device being slidable longitudinally within said holder, and power means to move said ram device.

5. The press device of claim 4 in which said end of said slide is forked to provide two tines, said means for support said wheel and tire assembly includes a plate exposed so that one edge is positioned to engage said tire, said end of said slide being positioned on the side of said tire opposite to said plate, said tines being arranged to straddle said plate.

* * * * *